United States Patent
Lee

(10) Patent No.: US 9,791,338 B2
(45) Date of Patent: Oct. 17, 2017

(54) PRESSURE SENSOR CAPABLE OF IMPROVING ASSEMBLING EFFICIENCY BY USING SPRING ELECTRODE

(71) Applicant: MANDO CORPORATION, Pyeongtaek-si, Gyeonggi-do (KR)

(72) Inventor: Gon Jae Lee, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 100 days.

(21) Appl. No.: 14/931,871

(22) Filed: Nov. 4, 2015

(65) Prior Publication Data
US 2016/0123827 A1     May 5, 2016

(30) Foreign Application Priority Data

Nov. 5, 2014   (KR) .................. 10-2014-0152666

(51) Int. Cl.
   *G01L 9/00*     (2006.01)
   *G01L 19/14*    (2006.01)

(52) U.S. Cl.
   CPC .......... *G01L 9/0002* (2013.01); *G01L 19/147* (2013.01)

(58) Field of Classification Search
   None
   See application file for complete search history.

(56) References Cited

U.S. PATENT DOCUMENTS 3,953,920 A * 5/1976 Endo .................. G01L 1/2287
                                                              156/272.2

* cited by examiner

*Primary Examiner* — Andre Allen
(74) *Attorney, Agent, or Firm* — Hauptman Ham, LLP

(57) ABSTRACT

Disclosed is to a pressure sensor including: a metal diaphragm configured to have a pressure sensing part disposed thereover; a first support configured to be coupled with the metal diaphragm; a first printed circuit board configured to be disposed over the pressure sensing part while being supported to the first support and electrically connected to the pressure sensing part; a connector configured to have a lower portion press-fitted with the first printed circuit board; a second printed circuit board configured to be electrically connected to the first printed circuit board through the connector while being press-fitted with an upper portion of the connector and supported by the connector; a second support configured to be disposed over the second printed circuit board; and a spring electrode configured to have an upper end protruding upward of the second support and have a lower end connected to the second printed circuit board.

21 Claims, 14 Drawing Sheets

PRESSURE SENSOR CAPABLE OF IMPROVING ASSEMBLING EFFICIENCY BY USING SPRING ELECTRODE

CROSS-REFERENCE TO RELATED APPLICATION

This application claims priority to Korean Patent Application No. 10-2014-0152666, filed on Nov. 5, 2014, the disclosure of which is incorporated herein by reference in its entirety.

BACKGROUND OF THE INVENTION

Field of the Invention

Exemplary embodiments of the present invention relate to a pressure sensor, and more particularly, to a pressure sensor with improved assembling performance.

Description of the Related Art

A pressure sensor is a part which is widely used in automobile, environmental equipment, medical instrument, etc. The pressure sensor has been used under conditions such as generation of vibrations, a sudden change in pressure, measurement of a wide range of use temperature, and high-pressure atmosphere.

A specific use example of the pressure sensor will be described below.

Generally, a brake system for deceleration or braking is provided in a vehicle. The brake system may include a pedal for delivering an operating force of a user, a booster and a master cylinder connected to the pedal to form a braking hydraulic pressure, and a wheel brake braking wheels of the vehicle depending on the braking hydraulic pressure input from the booster and the master cylinder.

When a driver steps on a brake pedal to generate a braking force, if a braking pressure is larger than road conditions or a friction force at the wheel brake generated by the braking pressure is larger than the braking force generated from tires or a road surface, a slip phenomenon that the tires slide on the road surface may occur in the brake system.

A steering apparatus is locked in the state in which the brake is operated, such that the driver may not perform the steering in his/her desired direction. Traditionally, to perform the steering upon the occurrence of the slip phenomenon, an anti-lock brake system (ABS) for electronically controlling a brake pedal effort has bee developed.

The anti-lock brake system includes a hydraulic unit equipped with a plurality of solenoid valves, a low-pressure accumulator and a high-pressure accumulator, etc., for controlling a braking hydraulic pressure delivered to a wheel brake and an electronic control unit (ECU) for controlling electrically operated components.

Further, the hydraulic unit is provided with a pressure sensor which senses a brake operating pressure generated from a master cylinder in proportion to the brake pedal effort of the driver and transfers the sensed brake operating pressure to an electronic control apparatus as an electrical signal. The electronic control apparatus controls the brake operation depending on the electrical signal transferred from the pressure sensor.

A detailed structure of the existing pressure sensor performing functions of the above-mentioned example will be described with reference to FIG. 1.

As illustrated, in the existing pressure sensor, a first printed circuit board 20 is disposed over a pressure sensing membrane 11 over a metal diaphragm 10.

Then, ultra bonding and soldering processes are performed, such that the first printed circuit board 20 and the pressure sensing membrane 11 are connected to each other through a lead wire 12. A resistance of the pressure sensing membrane 11 is delivered to the first printed circuit board 20.

A lower portion of the first printed circuit board 20 is bonded to one end of a copper stand 21 by soldering. Further, the other end of the copper stand 21 is welded to the metal diaphragm 10.

A second printed circuit board 40 is disposed over the first printed circuit board 20. A supporter 30 manufactured by plastic injection is provided between the first printed circuit board 20 and the second printed circuit board 40 to maintain an interval between the first printed circuit board 20 and the second printed circuit board 40.

A conductive pin 31 is fixed by penetrating through the supporter 30 to electrically connect between the first and second printed circuit boards 20 and 40 and both ends of the pin 31 form contacts on the first and second printed circuit boards 20 and 40 by a soldering process to electrically connect between the first and second printed circuit boards 20 and 40.

A lower end of the supporter 30 is provided with a bent protruding part 32 and thus the supporter 30 is fixedly assembled in a fixed concave groove 22 formed at a side surface portion of the copper stand 21. An upper end of the supporter 30 is assembled in a spring electrode fixing holder 50 formed at an upper portion of the second printed circuit board 40 and thus the supporter 30 is configured to be disposed in a middle portion between the first and second printed circuit boards 20 and 40.

The second printed circuit board 40 is a final board for providing an output to the outside and an upper portion thereof is connected to a spring electrode 60 for applying an external output and an input voltage. The upper portion of the second printed circuit board 40 is provided with a spring electrode fixing holder 50 for fixing the spring electrode 60 to be fixedly connected to the supporter 30.

To protect an internal structure in which the first and second printed circuit boards 20 and 40, the supporter 30, the spring electrode 60, and the spring electrode fixing holder 50 are assembled, an outer case 70 formed of metal is assembled. The outer case 70 is fixed to the metal diaphragm 10 by welding.

As described above, the existing pressure sensor suffers from the soldering process to electrically connect between the first printed circuit board and the second printed circuit board. To properly perform the soldering process, the second printed circuit board may be maintained in a horizontal state and a state in which it does not rotate.

Therefore, the pressure sensor needs the supporter supporting the second printed circuit board in a horizontal state as described above, and therefore the number of parts is increased, thereby making the assembling process complicated.

In addition, the supporter is necessarily provided with a structure in which the second printed circuit board does not rotate while being supported horizontally, for example, a structure in which a protrusion is formed on an inner circumferential surface of the supporter, a structure in which a groove through which the protrusion is inserted into an outer circumferential surface of the second printed circuit board is provided, etc. For this reason, there is a problem in that a shape of the supporter is complicated.

SUMMARY OF THE INVENTION

An object of the present invention relates to a pressure sensor capable of being implemented in an electrical connection structure between a first printed circuit board and a second printed circuit board in a more improved structure, not by a soldering process.

Another object of the present invention relates to a pressure sensor capable of improving assembling efficiency by performing an assembly in a state in which each part is aligned.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a pressure sensor includes: a metal diaphragm configured to have a pressure sensing part disposed thereover; a first support configured to be coupled with the metal diaphragm; a first printed circuit board configured to be disposed over the pressure sensing part while being supported to the first support and electrically connected to the pressure sensing part; a connector configured to have a lower portion press-fitted with the first printed circuit board; a second printed circuit board configured to be electrically connected to the first printed circuit board through the connector while being press-fitted with an upper portion of the connector and supported by the connector while being spaced apart upward of the first printed circuit board; a second support configured to be disposed over the second printed circuit board; and a spring electrode configured to have an upper end protruding upward of the second support while penetrating through the second support and have a lower end connected to the second printed circuit board.

The connector may include a first conductive part press-fitted in a first connection hole of the first printed circuit board, a second conductive part press-fitted in a second connection hole of the second printed circuit board, and a spaced part formed between the first conductive part and the second conductive part to electrically connect between the first conductive part and the second conductive part and maintain a spaced distance between the first printed circuit board and the second printed circuit board.

The second conductive part may have an upper end portion press-fitted in the second connection hole to protrude upward of the second printed circuit board.

A lower surface of the second support may be provided with a coupling groove to be coupled with an upper end of the second conductive part protruding upward of the second printed circuit board.

The second support may be disposed on an upper surface of the second printed circuit board while being coupled with the upper end portion of the second conductive part.

The connector may be formed in pair to face each other while being spaced apart from each other between the first printed circuit board and the second printed circuit board.

The first conductive part may be provided with a first press-fitting part having a convex shape in at least a portion of the overall length area.

When the first conducive part is press-fitted in the first connection hole, the first press-fitting part may have an elastically reduced width while being supported to an inner side surface of the first connection hole.

The second conductive part may be provided with a second press-fitting part having a convex shape in at least a portion of the overall length area.

When the second conducive part is press-fitted in the second connection hole, the second press-fitting part may have an elastically reduced width while being supported to an inner side surface of the second connection hole.

The first conductive part may be formed in a ring shape having an oval shape and a width of a central portion of the first conductive part may be elastically reduced while being supported to an inner side surface of the first connection hole when the first connection part is press-fitted in the first connection hole.

The second conductive part may be formed in a ring shape having an oval shape and a width of a central portion of the second conductive part may be elastically reduced while being supported to an inner side surface of the second connection hole when the second connection part is press-fitted in the second connection hole.

The first conductive part and the second conductive part may be formed in a ring shape having an oval shape and widths of central portions of the first and second conductive parts, respectively, may be elastically reduced while being supported to inner side surfaces of the first and second connection holes when the first and second conductive parts are press-fitted in the first and second connection holes.

Reduction directions of widths of central portions of each of the first conductive part and the second conducive part may be formed to be parallel with each other.

Reduction directions of widths of central portions of each of the first conductive part and the second conducive part may be formed to mismatch each other.

The first conductive part and the second conductive part may be each formed in plural to be spaced apart from each other.

The second printed circuit board may include a pair of guide grooves formed at sides facing each other.

The pair of guide grooves may be disposed in an asymmetric form to each other.

The pressure sensor may further include a guide member configured to enclose an outer portion of the first support, the connector, and the second printed circuit board and guide the second printed circuit board.

The guide member may be provided with a guide protrusion having the guide groove inserted thereinto to guide the second printed circuit board.

The guide member may be provided with a guide protrusion inside the guide member and the guide protrusion is inserted into the guide groove to guide the second printed circuit board.

A lower end of the guide member may be provided with a fastening protrusion and the first support may be provided with a fastening groove correspondingly coupled with the fastening protrusion.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
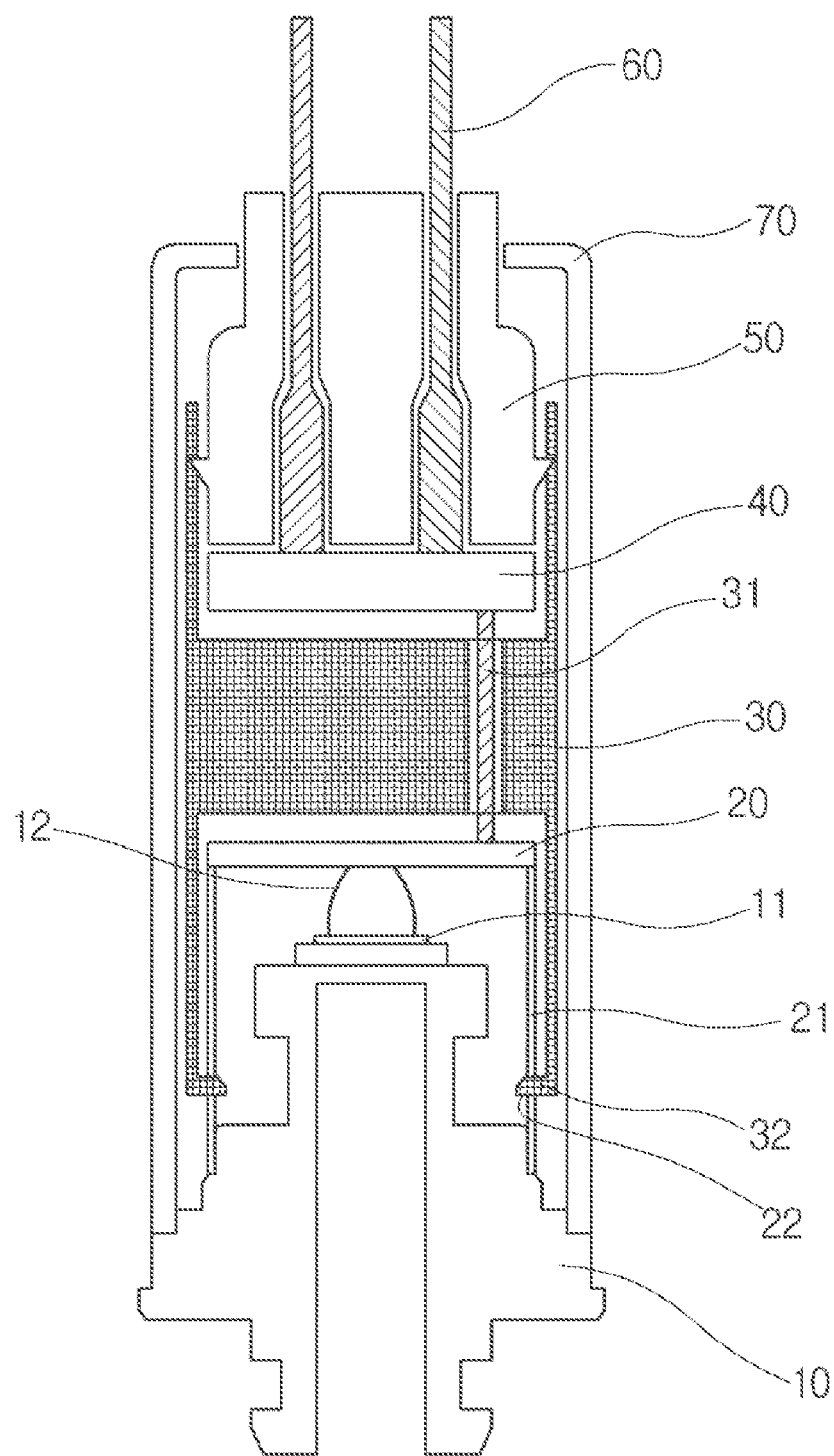
FIG. 1 is a cross-sectional view illustrating the existing pressure sensor.

Hereinafter, a pressure sensor according to an exemplary embodiment of the present invention will be described in detail with reference to the accompanying drawings.

During the process, a thickness of lines, a size of components, or the like, illustrated in the drawings may be exaggeratedly illustrated for clearness and convenience of explanation. Further, the following terminologies are defined in consideration of the functions in the present invention and may be construed in different ways by intention or practice of users and operators. Therefore, the definitions of terms used in the present description should be construed based on the contents throughout the specification.

In addition, the following embodiments are not limited to the scope of the present invention but illustrate only the components included in the claims of the present invention and it will be appreciated that embodiments including components which are included in the spirit of the specification of the present invention and may be substituted into equivalents in the components of the claims may be included in the scope of the present invention.

Figure 2:
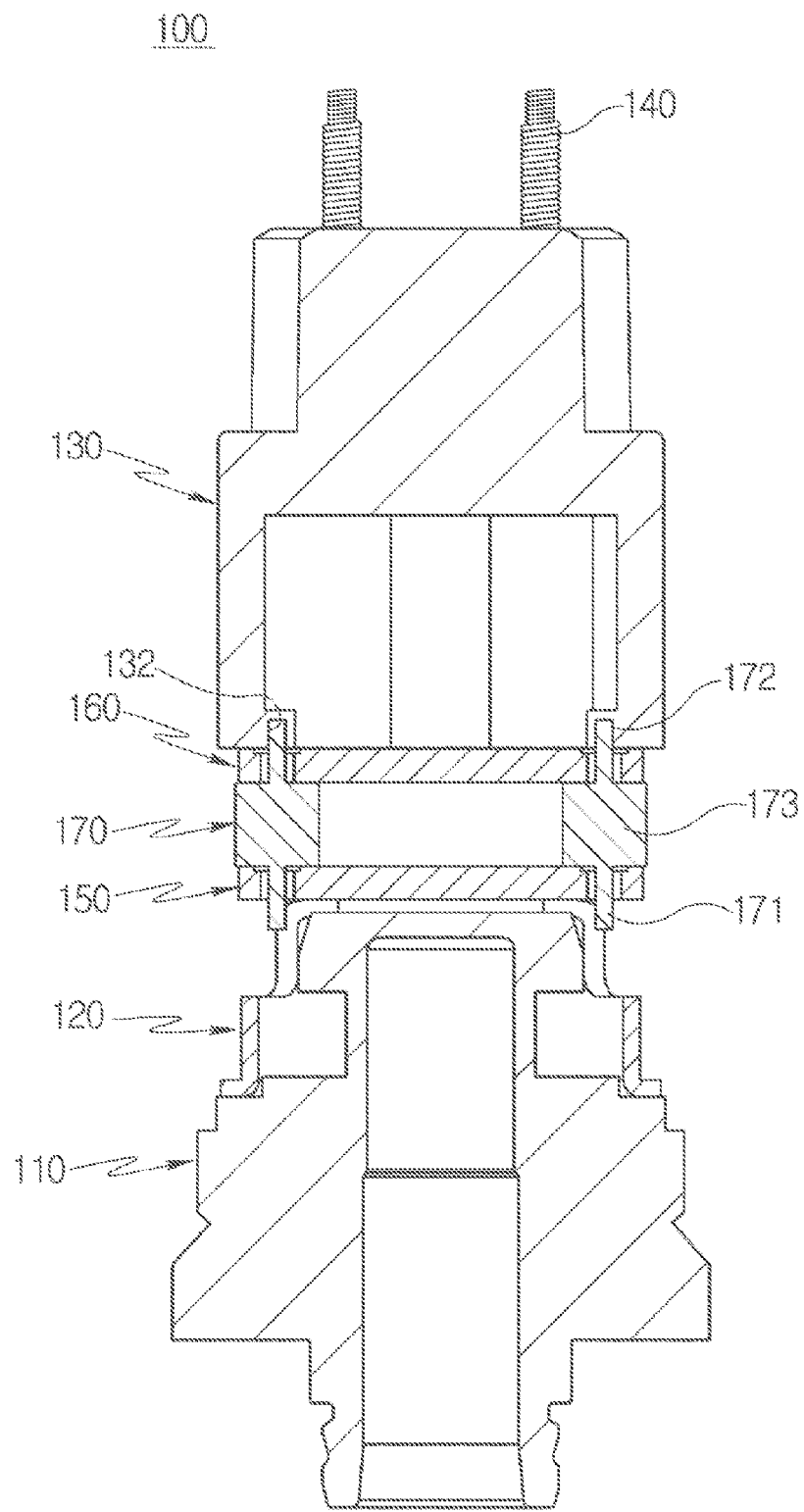
FIG. 2 is a cross-sectional view of a pressure sensor according to an exemplary embodiment of the present invention.
Figure 3:
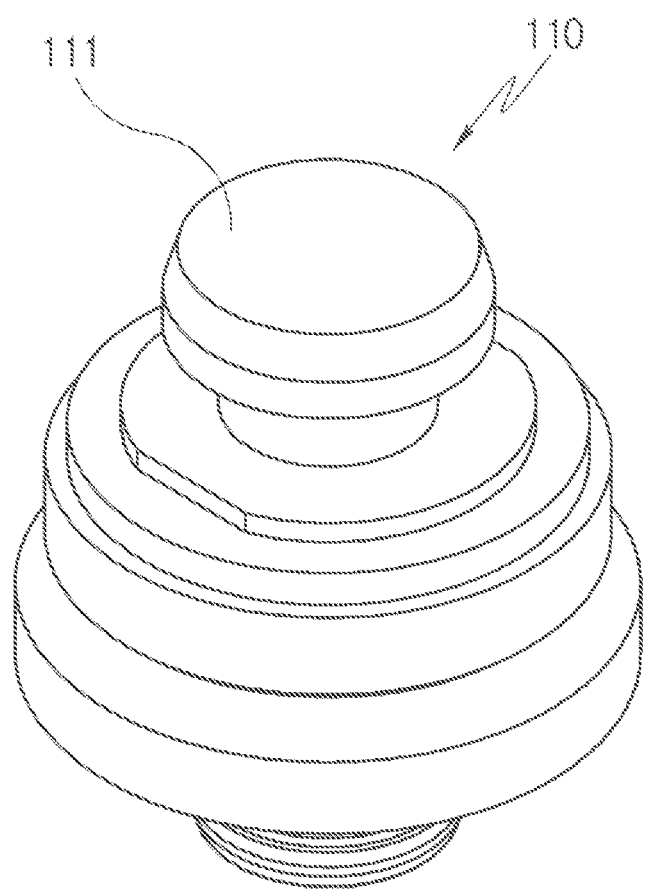
FIG. 3 is a perspective view illustrating a metal diaphragm illustrated in FIG. 2.
Figure 4:
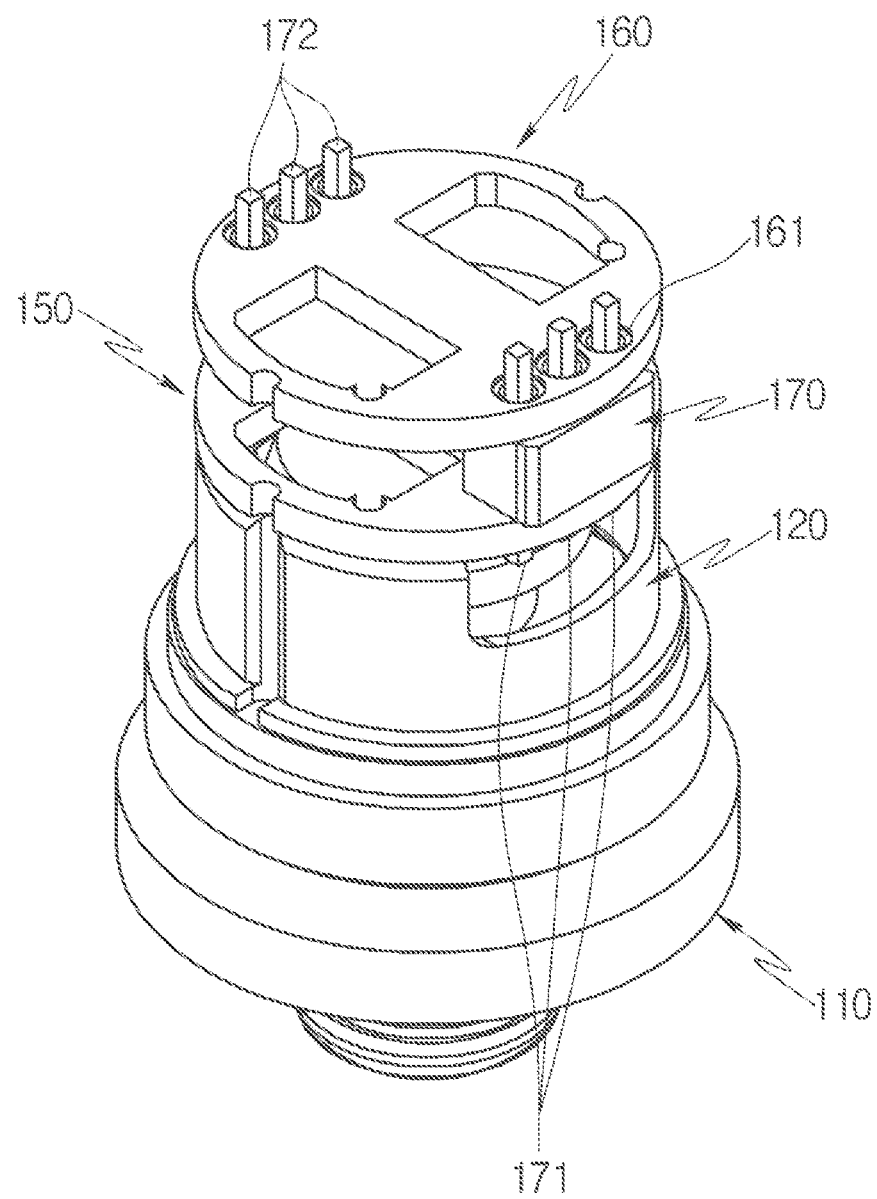
FIG. 4 is a perspective view illustrating a state in which the metal diaphragm, a first support, a first printed circuit board, a connector, and a second printed circuit board illustrated in FIG. 2 are assembled.
Figure 7:
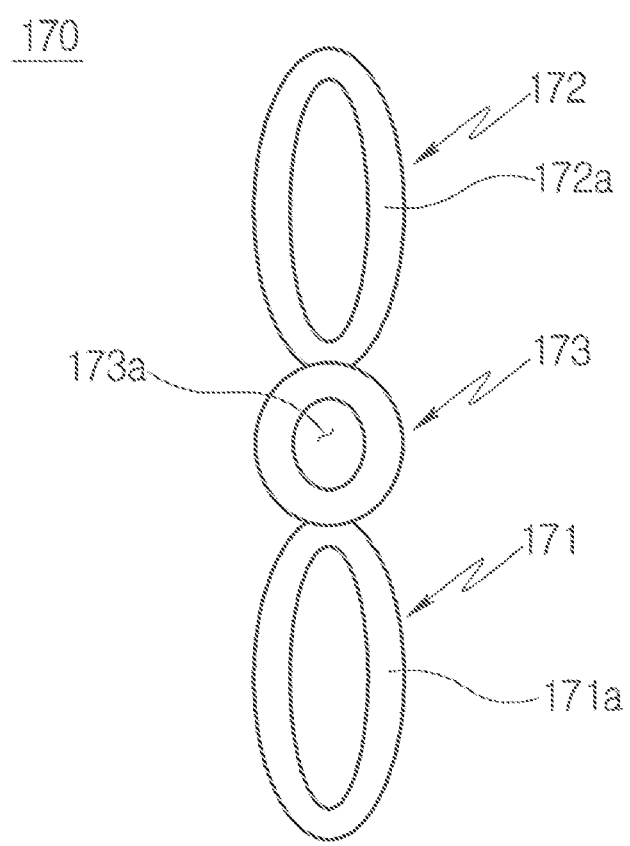
Figure 8:
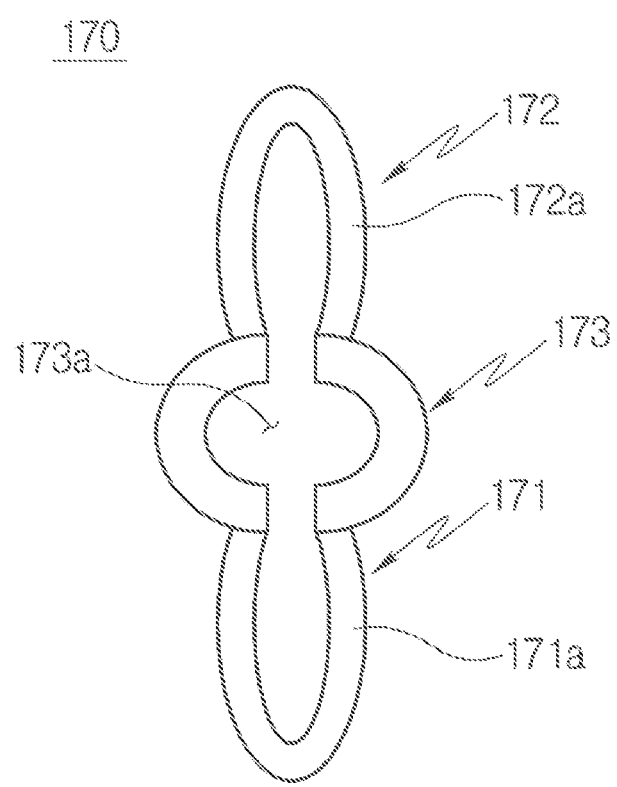
Figure 9:
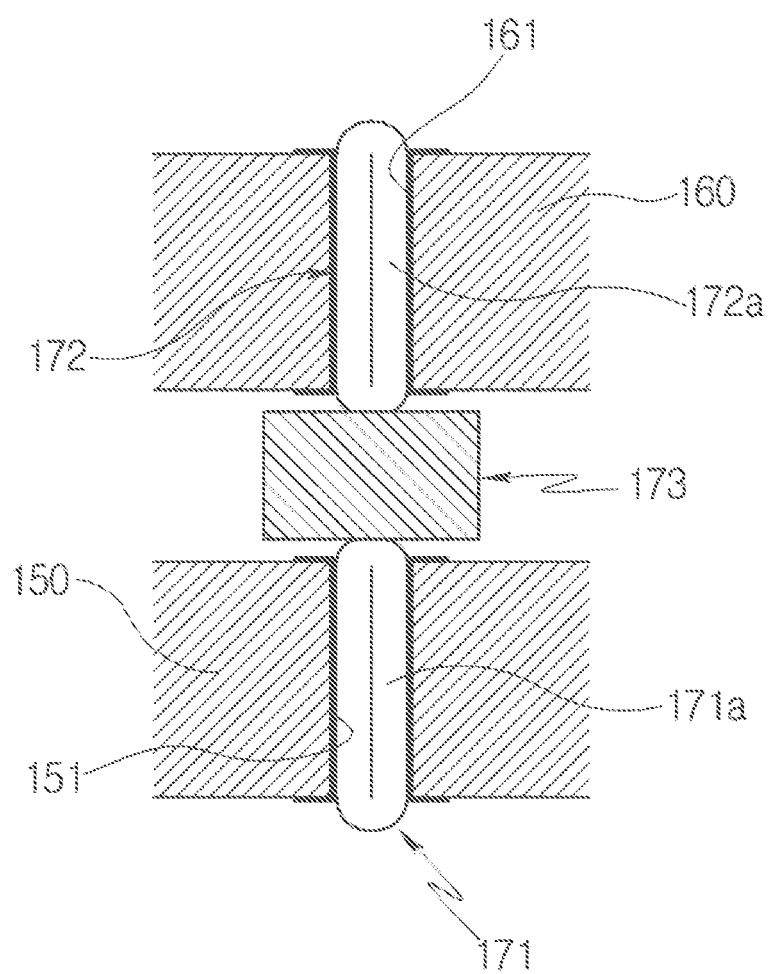
FIGS. 9 and 10 are cross-sectional views of main parts illustrating a connection structure between a first printed circuit board and a second printed circuit board illustrated in FIG. 2.
Figure 10:
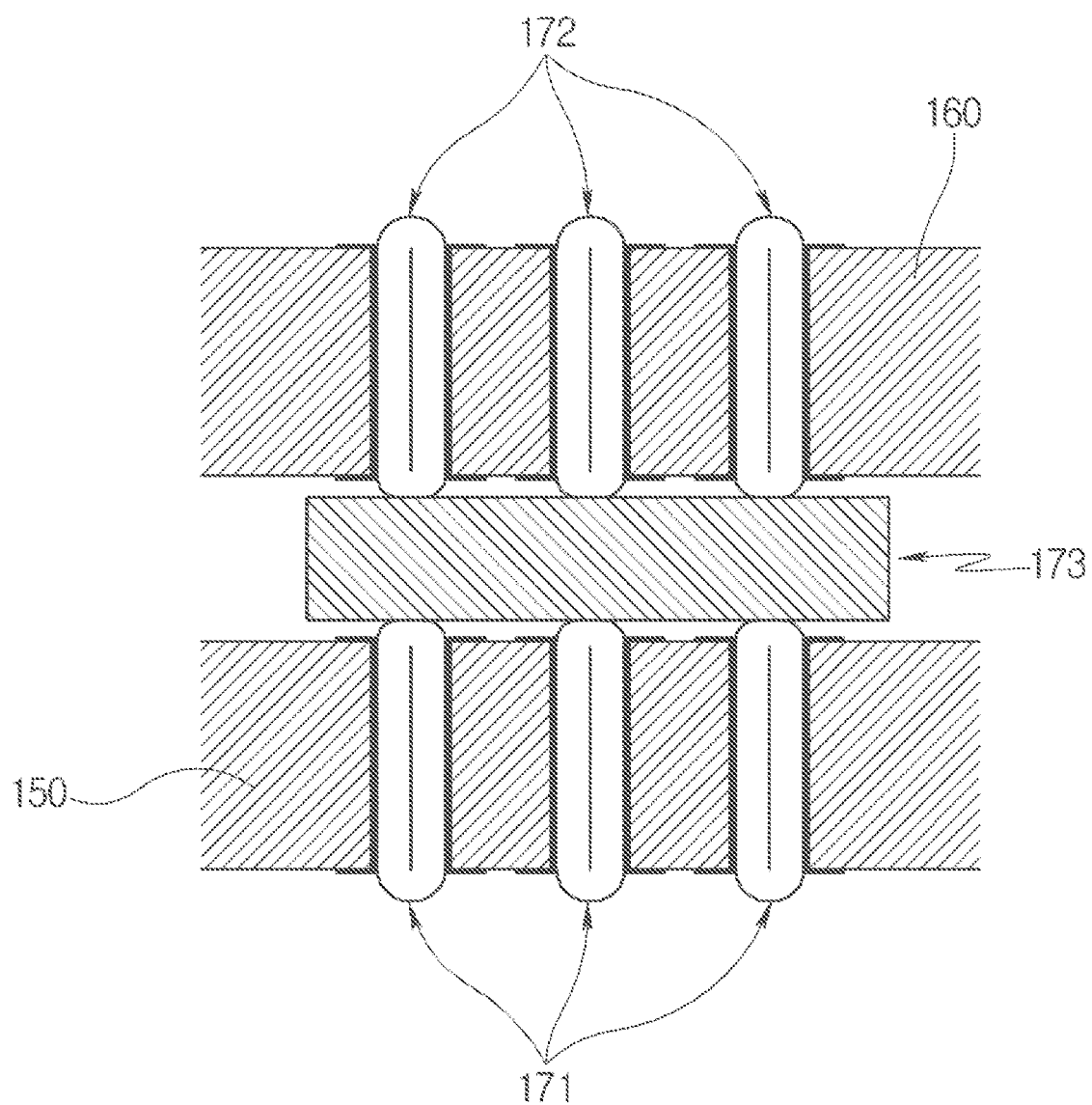
Figure 11:
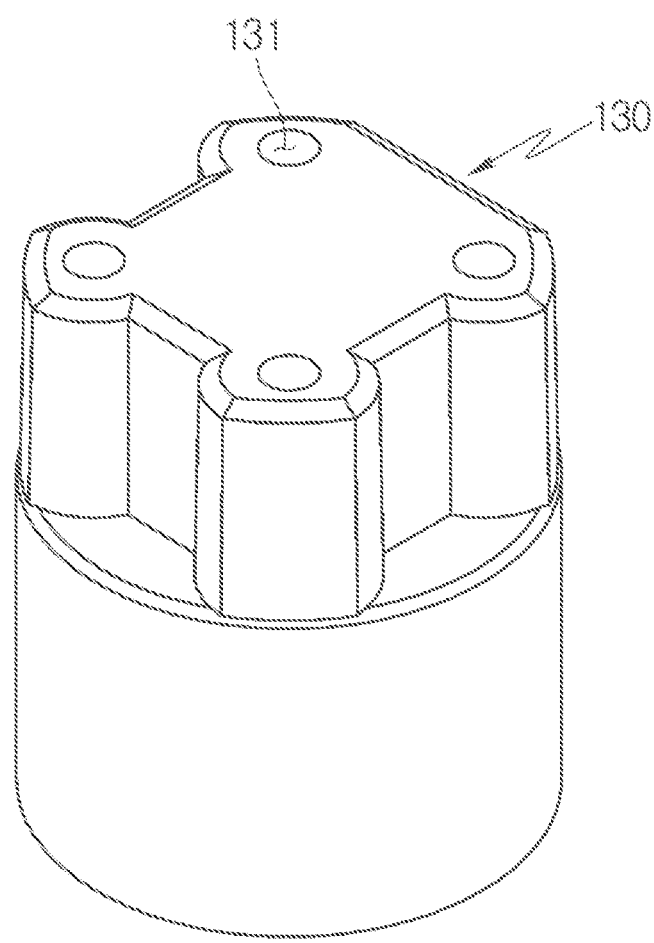
FIG. 11 is a perspective view illustrating the second support illustrated in FIG. 2.
Figure 12:
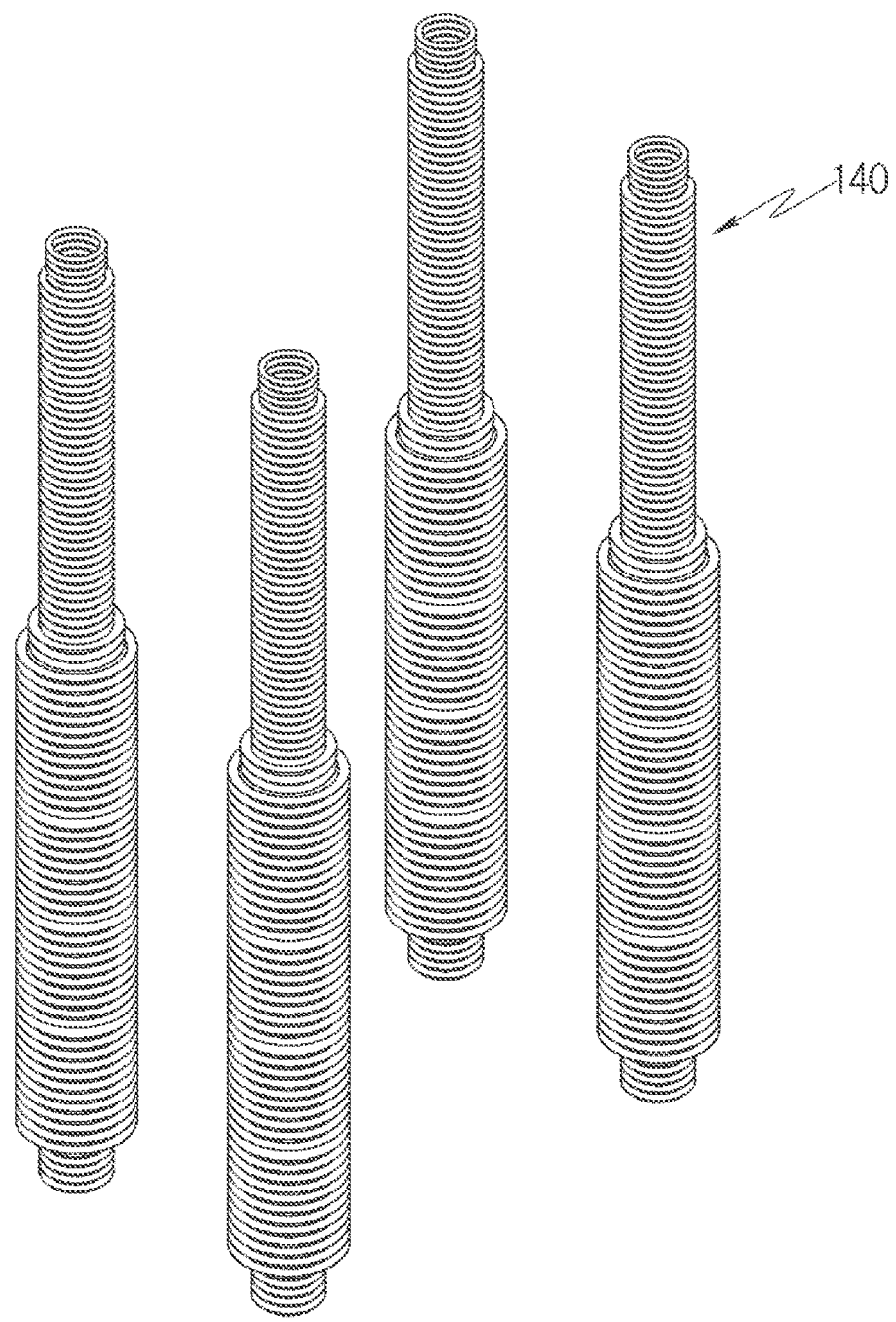
FIG. 12 is a perspective view illustrating a spring electrode illustrated in FIG. 2.

FIG. 2 is a cross-sectional view of a pressure sensor according to an exemplary embodiment of the present invention, FIG. 3 is a perspective view illustrating a metal diaphragm illustrated in FIG. 2, FIG. 4 is a perspective view illustrating a state in which the metal diaphragm, a first support, a first printed circuit board, a connector, and a second printed circuit board illustrated in FIG. 2 are assembled, FIGS. 5 to 8 are front views illustrating the connector, FIGS. 9 and 10 are cross-sectional views of main parts illustrating a connection structure between a first printed circuit board and a second printed circuit board illustrated in FIG. 2, FIG. 11 is a perspective view illustrating the second support illustrated in FIG. 2, and FIG. 12 is a perspective view illustrating a spring electrode illustrated in FIG. 2.

Referring to FIG. 2, a pressure sensor 100 according to an exemplary embodiment of the present invention includes a metal diaphragm 110, a first support 120, a first printed circuit board 150, a second printed circuit board 160, a connector 170, a second support 130, and spring electrodes 140.

The metal diaphragm 110 may be made of SUS304, SUS316, SUS630, or an alloy such as inconel, according to service environments and pressure specifications. As illustrated in FIG. 3, a pressure sensing part 111 is formed over the metal diaphragm 110. The pressure sensing part 111 may sense a change in compressive stress, tensile stress, etc. An upper surface of the pressure sensing part 111 may be provided with a circuit pattern (not illustrated) which may be electrically connected to the first printed circuit board 150 to be described below.

Referring to FIG. 4, the first support 120 may have a cylindrical shape. A lower end portion of the first support 120 may be fixed to an outer circumferential surface of the metal diaphragm 110 by various methods such as welding.

A lower surface of the first printed circuit board 150 may be fixed to an upper end portion of the first support 120 by method such as soldering. The first printed circuit board 150 may be electrically connected to the pressure sensing part 111 by various means such as a lead wire (not illustrated).

The change in resistance sensed by the pressure sensing part 111 is delivered to the first printed circuit board 150.

The second printed circuit board 160 is disposed over the first printed circuit board 150. Further, the first printed circuit board 150 and the second printed circuit board 160 are electrically connected to each other by the connector 170. The first printed circuit board 150 may be provided with a first connection hole 151 in a direction opposite to each other and the first connection hole 151 may be coupled with a lower portion of the connector 170. The second printed circuit board 160 may be provided with a second connection hole 161 in a direction opposite to each other and the second connection hole 161 may be coupled with an upper portion of the connector 170.

A structure in which the first printed circuit board 150 and the second printed circuit board 160 are connected to each other by the connector 170 will be described with reference to FIGS. 5 to 10.

The connector 170 serves to electrically connect between the first printed circuit board 150 and the second printed circuit board 160 and may include a first conductive part 171, a second conductive part 172, and a spaced part 173.

The first conductive part 171 and the second conductive part 172 may be made of a conductive material, for example, a metal material and may be integrally formed with each other. The first conductive part 171 may be inserted into the first connection hole 151 of the first printed circuit board 150 and the second conductive part 172 may be inserted into the second connection hole 161 of the second printed circuit board 160.

The spaced part 173 which is formed between the first conductive part 171 and the second conductive part 172 may serve to maintain a spaced distance between the first printed circuit board 150 and the second printed circuit board 160 simultaneously with electrically connecting between the first conductive part 171 and the second conductive part 172.

The spaced part 173 may have, for example, a hexahedral shape and may be integrally formed between the first conductive part 171 and the second conductive part 172.

Further, an outer side portion of the spaced part 173 may be made of an insulating material and an inside thereof may be provided with an upper end portion of the first conductive part 171 and a lower end of the second conductive part 172 which are electrically connected to each other.

FIGS. 5 to 8 illustrate various structures of the connector which is applied to the present invention.

Figure 5:
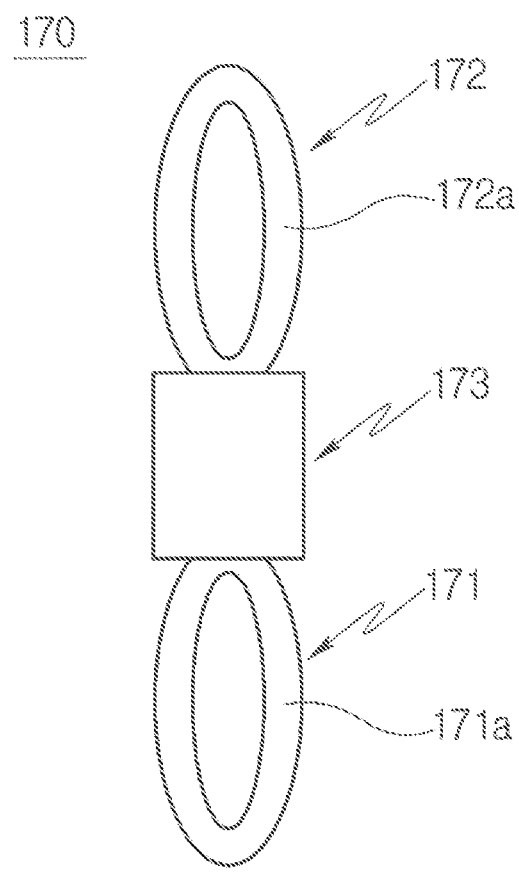
FIGS. 5 to 8 are front views illustrating various modification examples of the connector illustrated in FIG. 2.

Referring to FIG. 5, the first conductive part 171 of the connector 170 may include a first press-fitting part 171a which horizontally protrudes in at least some of the overall length area in a vertical direction, for example, a central area.

When the first conductive part 171 provided with the first press-fitting part 171*a* is coupled into the first connection hole 151 disposed on the first printed circuit board 150 as illustrated in FIG. 9, a convex outer side surface of the first pressing fitting part 171*a* may be press-fitted into an inner side surface of the first connection hole 151.

In this case, the first conductive part 171 may be made of an elastic material or a shape thereof may be elastically deformed and thus may also be elastically coupled with the first connection hole 151.

A lateral width of the first press-fitting part 171*a* may be elastically reduced while the first conductive part 171 is press-fitted in the first connection hole 151 due to material characteristics or structural characteristics.

As the detailed example, the first conductive part 171 may be made of a conductive material and as illustrated, may have an oval ring shape so that it includes the first press-fitting part 171*a* having a convex shape.

The first conducive part 171 has the ring shape, such that an inside of the ring may be formed with a space. A thickness of the ring is thinly formed, such that a width of the first press-fitting part 171*a* may be deformed to be reduced to some degree in a direction inwardly of the ring shape, that is, a horizontal direction.

Similar to the first conductive part 171, the second conductive part 172 may be provided with a second press-fitting part 172*a* and as illustrated in FIG. 9, may be press-fitted in the second connection hole 161 formed on the second printed circuit board 160. The second conductive part 172 may have a material or a shape similar to the first conductive part 171 and the detailed description thereof will be omitted.

The spaced part 173 may have a volume which is not inserted into the first connection hole 151 and the second connection hole 161 as illustrated in FIG. 9 so as to space between the first printed circuit board 150 and the second printed circuit board 160.

FIG. 9 illustrates a state in which the first printed circuit board 150 and the second printed circuit board 160 is electrically connected to each other by the connector 170.

Referring to FIG. 9, the first conductive part 171 and the second conductive part 172 may be formed to widely surface-contact an inner side surface of the first connection hole 151 and an inner side surface of the second connection hole 161 through an outer side surface of the first press-fitting part 171*a* and an outer side surface of the second press-fitting part 172*a*. Therefore, it is possible to improve reliability of an electrical connection between the first printed circuit board 150 and the second printed circuit board 160.

Figure 6:
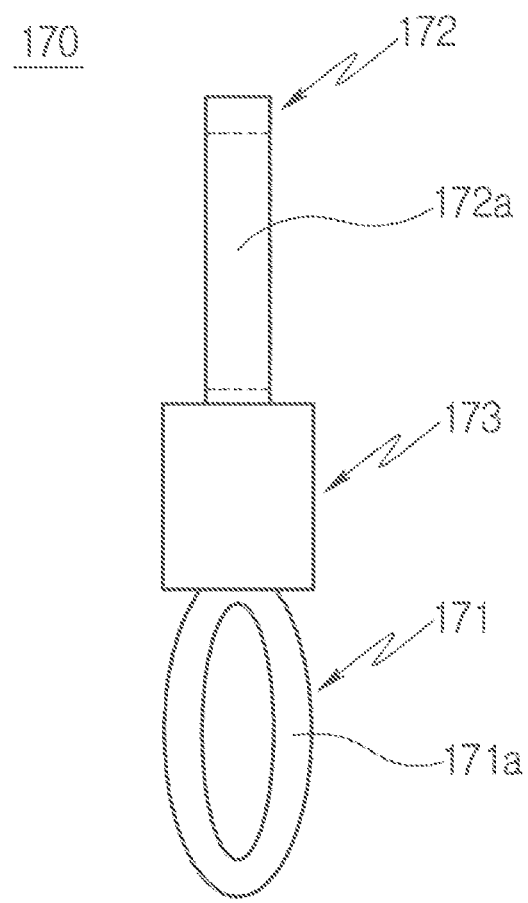

FIG. 6 illustrates another example of the connector 170 illustrated in FIG. 5.

First, an example in which the connector illustrated in FIG. 5 is formed so that the first conductive part 171 and the second conductive part 172 have a direction parallel with each other in a direction in which the widths of the first press-fitting part 171*a* and the second press-fitting part 172*a* are reduced is illustrated.

The first conductive part 171 and the second conductive part 172 both are formed so that the space inside the ring shape is opened in front and back directions. Therefore, the reduction directions of the widths of the first press-fitting part 171*a* and the second press-fitting part 172*a* both are parallel with each other in a horizontal direction or coincide with each other.

However, the present disclosure is not limited to the above example. Like another example of the connector 170 illustrated in FIG. 6, the inner space of the ring shape forming the first conductive part 171 is opened in the front and back directions and the inner space of the ring shape forming the second conductive part 172 are opened in the left and right directions, such that the reduction direction of the width of the second press-fitting part 172*a* and the reduction direction of the width of the first press-fitting part 171*a* may mismatch each other.

FIGS. 7 and 8 illustrate the connector 170 to which another example of the spaced part 173 illustrated in FIG. 5 is applied. The connector 170 illustrated in FIGS. 7 and 8 is different from the connector illustrated in FIGS. 5 and 6 in that a space 173*a* is formed inside the spaced part 173.

Prior to the detailed description related to the illustrate example, first, vibration or external force may be applied to the printed circuit boards 150 and 160 according to the use of the pressure sensor 100 according to the exemplary embodiment of the present invention. In this connection, if the length of the connector 170 is not changed, the spaced distance between the printed circuit boards 150 and 160 is not changed and the vibration or the external force are delivered to the board as they are and thus the board may be damaged.

Therefore, to conform to the vibration or the external force, the spaced distance between the boards may be elastically changed. As described above, the inside of the spaced part 173 is provided with a space 173*a* and thus the change may be permitted. A width in a vertical direction of the spaced part 173 may be elastically reduced due to the space 173*a* formed in the spaced part 173.

Therefore, when the vibration or the external force in the vertical direction occurs in the first printed circuit board 150 or the second printed circuit board 160, the width in the vertical direction of the spaced part 173 may be elastically reduced to conform to the vibration or the external force, such that the spaced distance between the first printed circuit board 150 and the second printed circuit board 160 may be elastically changed.

The external force applied to the first printed circuit board 150 or the second printed circuit board 160 is absorbed while the width of the spaced part 173 is reduced, such that the damage to the first printed circuit board 150 and the second printed circuit board 160 may be prevented.

Meanwhile, FIG. 10 illustrates another example of the connector 170 illustrated in FIG. 9. The example illustrated in FIG. 10 is different from the connector 170 illustrated in FIG. 9 in that the first conductive part 171 and the second conductive part 172 may be formed in plural.

The example in which three second conductive parts 172 and three first conductive parts 171 are formed at the upper and lower portions of the spaced part 173 is illustrated. Further, the plurality of first conductive parts 171 and second conductive parts 172 are disposed to be spaced apart from each other. An example of the connector 170 may be applied to the case in which the electrical connection portion between the first printed circuit board 150 and the second printed circuit board 160 is formed in plural.

The connector 170 is press-fitted between the first printed circuit board 150 and the second printed circuit board 160, such that the second printed circuit board 160 over the first printed circuit board 150 may be supported by the connector 170 without a separate support.

Further, as the first printed circuit board 150 is fixed to the first support 120 and thus the movement thereof is limited, the second printed circuit board 160 is integrated with the first printed circuit board 150 via the connector 170 and thus the second printed circuit board 160 does not move. Even though the separate support is not provided, the second printed circuit board 160 may hold its own position.

Meanwhile, the connector 170 may also be configured in plural. Here, the example in which the pair of connectors 170 spaced apart from each other while facing each other between the first printed circuit board 150 and the second printed circuit board 160 connects between the first printed circuit board 150 and the second printed circuit board 160 is illustrated.

The first printed circuit board 150 and the second printed circuit board 160 are connected to each other by the pair of connectors 170 disposed to be opposite to each other, such that the second printed circuit board 160 may more firmly hold its own position.

The second printed circuit board 160 is connected to the spring electrodes 140 illustrated in FIG. 12 to be electrically connected to the outside. The sprint electrode 140 is electrically connected to the upper surface of the second printed circuit board 160 and the second support 130 as illustrated in FIG. 11 may be disposed over the second printed circuit board 160 to support the spring electrode 140.

The second support 130 may be provided with an electrode hole 131 vertically penetrating therethrough and the above-mentioned spring electrode 140 may penetrate through the electrode hole 131. A lower end of the spring electrode 140 is connected to the second printed circuit board 160 and an upper end thereof may protrude upwardly of the second support 130.

Describing a detailed example of the structure in which the second support 130 is disposed on the second printed circuit board 160, first, an upper end portion of the second conductive part 172 may protrude upward of the second printed circuit board 160 as illustrated in FIG. 4 in the state in which the second conductive part 172 is press-fitted in the second connection hole 161.

Further, a coupling groove 132 with which the upper end portion of the second conductive part 172 may be coupled may be formed on a lower surface of the second support 130. The upper end portion of the second conductive part 172 may be coupled with the coupling groove 132 while the second support 130 is disposed on the second printed circuit board 160 and may be disposed on the second printed circuit board 160 while holding its own position by the coupling structure.

Meanwhile, the pressure sensor 100 according to the exemplar embodiment of the present invention may further include a case (not illustrated) for protecting the foregoing components included in the pressure sensor from the external environment.

Figure 13:
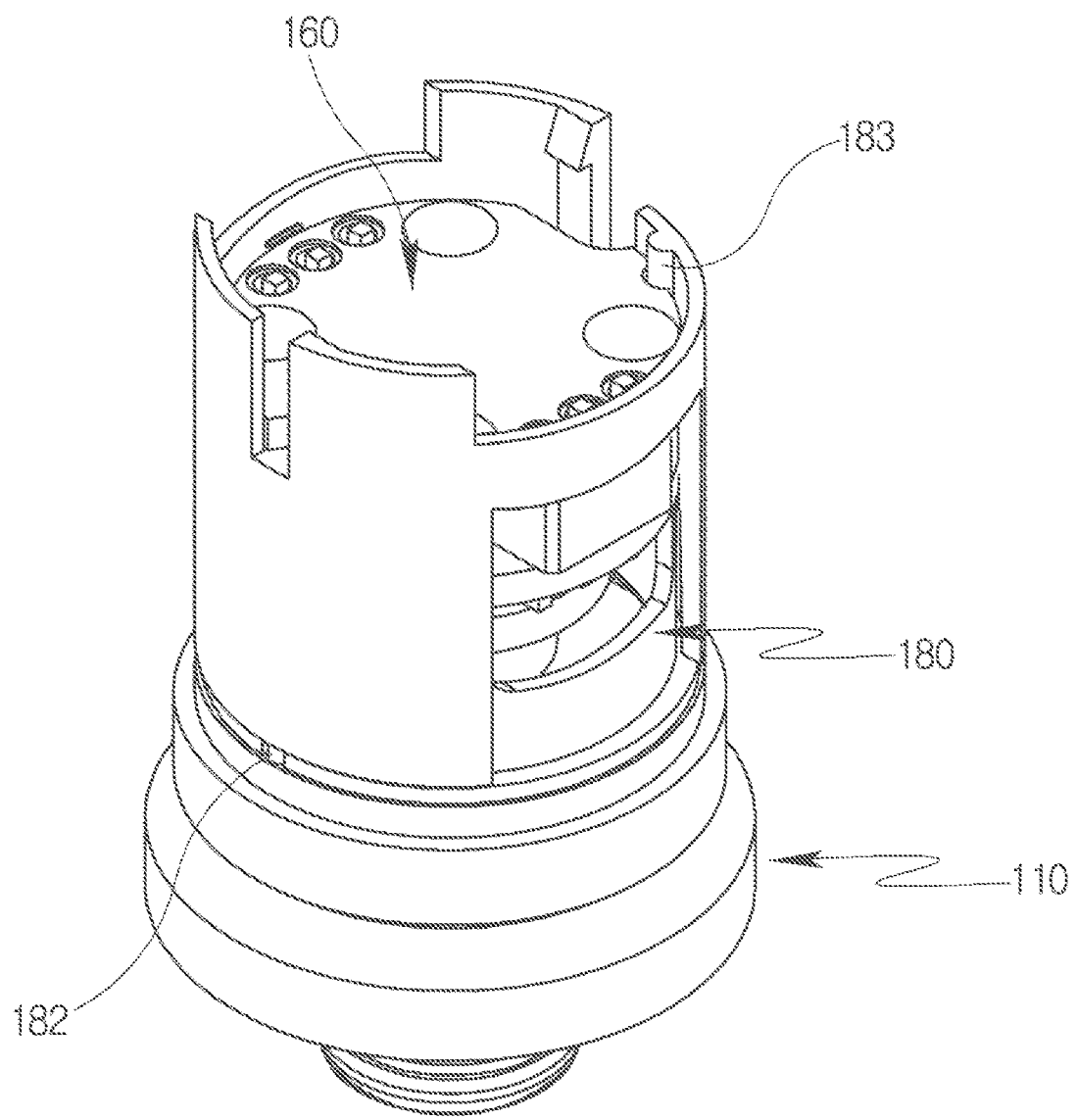
FIG. 13 is a perspective view illustrating a portion of a pressure sensor according to another exemplary embodiment of the present invention.
Figure 14:
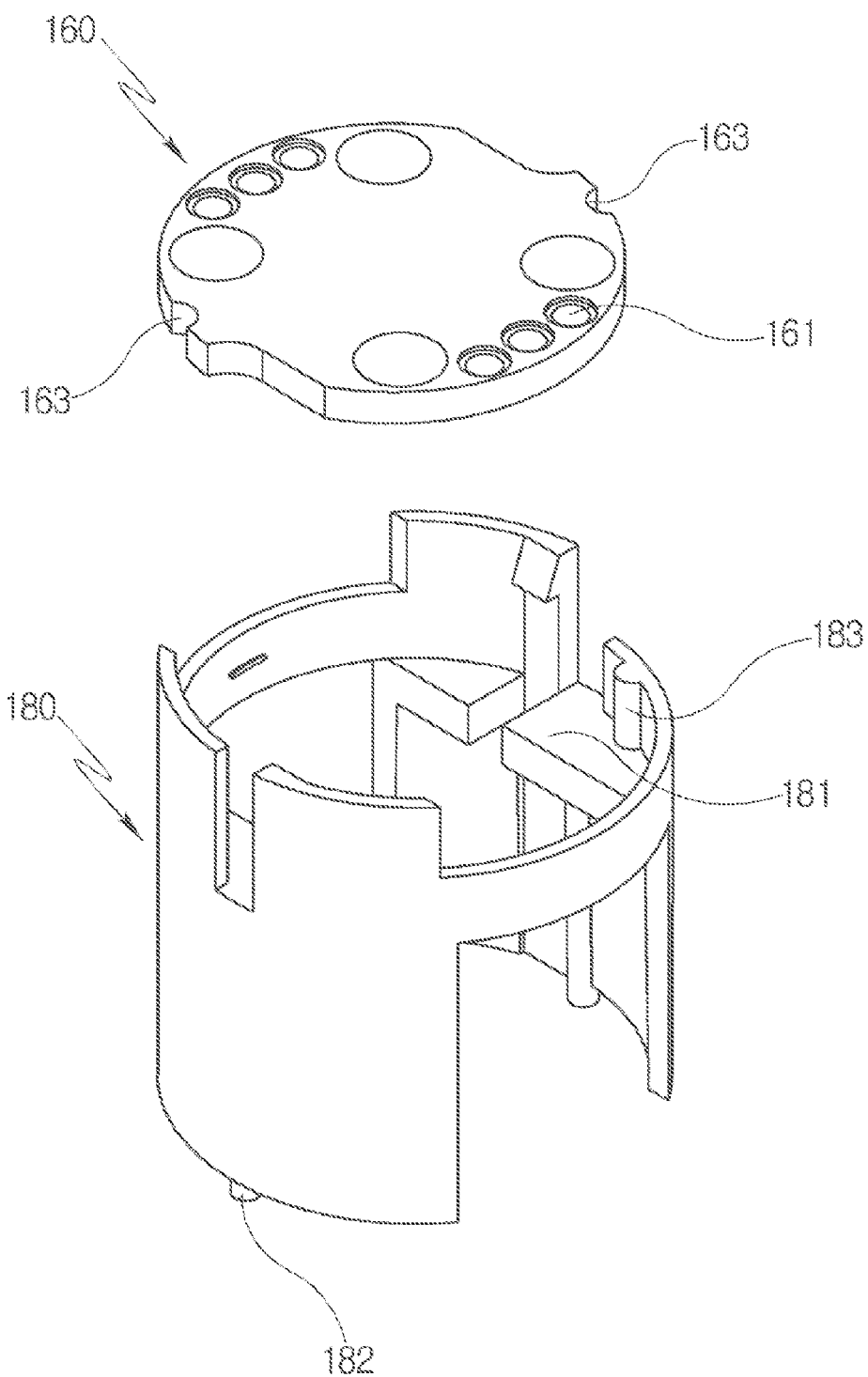
FIG. 14 is an exploded perspective view of main parts of the pressure sensor illustrated in FIG. 13.

FIGS. 13 and 14 are perspective view and exploded perspective view illustrating a pressure sensor according to another exemplary embodiment of the present invention.

Referring to FIGS. 13 and 14, the pressure sensor according to another exemplary embodiment of the present invention may further include a guide member 180 formed at an outside thereof to enclose the first support 120, the first printed circuit board 150, the second printed circuit board 160, and the connector 170.

A lower end edge of the first support body 120 may be provided with a flange 121 protruding outwardly and the flange 121 may be provided with at least one fastening groove 122. Further, a lower end of the guide member 180 may be provided with at least one fastening protrusion 182 correspondingly coupled with the fastening groove 122. Therefore, the fastening protrusion 182 of the guide member 180 is fastened with the fastening groove 122 of the first support 120, such that the guide member 180 may be stably disposed at the outside of the first support 120, the first printed circuit board 150, the second printed circuit board 160, and the connector 170.

The guide member 180 serves to protect the first support 120, the first printed circuit board 150, the second printed circuit board 160, and the connector 170 installed therein from the external pressure and to guide the assembling of the second printed circuit board 160 with the connector 170 in the state in which they are aligned.

The guide member 180 may have approximately a cylindrical shape and an inside thereof may be provided with a stand 181 seated with the second printed circuit board 160 and protruding in an inner diameter direction.

The second printed circuit board 160 may be provided with a pair of straight parts 162 in a direction opposite to each other and each straight part 162 may be provided with guide grooves 163. Each straight part 162 may be formed at a position where it does not interfere with a portion where the second connection hole 161 is formed.

Each guide groove 163 may be formed at a position where they are symmetrical with each other or may also be formed at a position where they mismatch each other without being symmetrical with each other. In this case, when the guide grooves 163 are disposed to mismatch each other, a coupling error may be prevented when they are coupled with guide protrusions of the guide member 180.

An inner circumferential surface of the guide member 180 may be provided with a guide protrusion 183 correspondingly coupled with the guide groove 163 of the second printed circuit board 160. The guide protrusion 183 may be disposed over the stand 181. Therefore, the second printed circuit board 160 does not rotate and is guided to horizontally descend along the guide protrusion 183 in the state in which the guide groove 163 of the second printed circuit board 160 is coupled with the guide protrusion 183 of the guide member 180, such that the assembling with the second conductive part 172 of the connector 170 may also be progressed in the balanced state.

Meanwhile, the guide groove 163 formed at each straight part 162 of the second printed circuit board 160 may be in plural, such that the guide protrusion 183 of the guide member 180 coupled with the guide groove 163 may also be formed in plural.

According to the exemplary embodiments of the present invention, the first printed circuit board and the second printed circuit board may be connected to each other by the connector for forming the press-fitting structure between the first printed circuit board and the second printed circuit board, thereby removing the soldering process conventionally performed. By this, it is possible to simplify the process.

Further, since the second printed circuit board may be supported by the connector, the separate support provided to support the second printed circuit board may be removed. By this, it is possible to reduce the number of parts and simplify the assembling process.

Further, the first conductive part and the second conductive part formed in the connector may be connected to each other while having the wide contact area in the first connection hole and the second connection hole due to the structural features, thereby more improving the connection reliability and the durability than the existing soldering structure.

Although the preferred embodiments of the present invention have been disclosed for illustrative purposes, they are for specifically explaining the present invention. Therefore, the exemplary embodiments of the present invention is not limited thereto, but those skilled in the art will appreciate that various modifications and alteration are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A pressure sensor, comprising:
a metal diaphragm configured to have a pressure sensing part disposed thereover;
a first support configured to be coupled with the metal diaphragm;
a first printed circuit board configured to be disposed over the pressure sensing part while being supported to the first support and electrically connected to the pressure sensing part;
a connector configured to have a lower portion press-fitted with the first printed circuit board;
a second printed circuit board configured to be electrically connected to the first printed circuit board through the connector while being press-fitted with an upper portion of the connector and supported by the connector while being spaced apart upward of the first printed circuit board;
a second support configured to be disposed over the second printed circuit board; and
a spring electrode configured to have an upper end protruding upward of the second support while penetrating through the second support and have a lower end connected to the second printed circuit board.

2. The pressure sensor of claim 1, wherein the connector includes a first conductive part press-fitted in a first connection hole of the first printed circuit board, a second conductive part press-fitted in a second connection hole of the second printed circuit board, and a spaced part formed between the first conductive part and the second conductive part to electrically connect between the first conductive part and the second conductive part and maintain a spaced distance between the first printed circuit board and the second printed circuit board.

3. The pressure sensor of claim 2, wherein the second conductive part has an upper end portion press-fitted in the second connection hole to protrude upward of the second printed circuit board.

4. The pressure sensor of claim 3, wherein a lower surface of the second support is provided with a coupling groove to be coupled with an upper end of the second conductive part protruding upward of the second printed circuit board.

5. The pressure sensor of claim 2, wherein the second support is disposed on an upper surface of the second printed circuit board while being coupled with the upper end portion of the second conductive part.

6. The pressure sensor of claim 2, wherein the connector is formed in pair to face each other while being spaced apart from each other between the first printed circuit board and the second printed circuit board.

7. The pressure sensor of claim 2, wherein the first conductive part is provided with a first press-fitting part having a convex shape in at least a portion of the overall length area.

8. The pressure sensor of claim 7, wherein when the first conducive part is press-fitted in the first connection hole, the first press-fitting part has an elastically reduced width while being supported to an inner side surface of the first connection hole.

9. The pressure sensor of claim 2, wherein the second conductive part is provided with a second press-fitting part having a convex shape in at least a portion of the overall length area.

10. The pressure sensor of claim 9, wherein when the second conducive part is press-fitted in the second connection hole, the second press-fitting part has an elastically reduced width while being supported to an inner side surface of the second connection hole.

11. The pressure sensor of claim 2, wherein the first conductive part is formed in a ring shape having an oval shape and a width of a central portion of the first conductive part is elastically reduced while being supported to an inner side surface of the first connection hole when the first connection part is press-fitted in the first connection hole.

12. The pressure sensor of claim 2, wherein the second conductive part is formed in a ring shape having an oval shape and a width of a central portion of the second conductive part is elastically reduced while being supported to an inner side surface of the second connection hole when the second connection part is press-fitted in the second connection hole.

13. The pressure sensor of claim 2, wherein the first conductive part and the second conductive part are formed in a ring shape having an oval shape and widths of central portions of the first and second conductive parts, respectively, are elastically reduced while being supported to inner side surfaces of the first and second connection holes when the first and second conductive parts are press-fitted in the first and second connection holes.

14. The pressure sensor of claim 13, wherein reduction directions of widths of central portions of each of the first conductive part and the second conducive part are formed to be parallel with each other.

15. The pressure sensor of claim 13, wherein reduction directions of widths of central portions of each of the first conductive part and the second conducive part are formed to mismatch each other.

16. The pressure sensor of claim 13, wherein the first conductive part and the second conductive part are each formed in plural to be spaced apart from each other.

17. The pressure sensor of claim 1, wherein the second printed circuit board includes a pair of guide grooves formed at sides facing each other.

18. The pressure sensor of claim 17, wherein the pair of guide grooves is disposed in an asymmetric form to each other.

19. The pressure sensor of claim 18, further comprising:
a guide member configured to enclose an outer portion of the first support, the connector, and the second printed circuit board and guide the second printed circuit board.

20. The pressure sensor of claim 19, wherein the guide member has a guide protrusion inside the guide member and the guide protrusion is inserted into the guide groove to guide the second printed circuit board.

21. The pressure sensor of claim 19, wherein a lower end of the guide member is provided with a fastening protrusion and the first support is provided with a fastening groove correspondingly coupled with the fastening protrusion.

* * * * *